(12) United States Patent
Nagai et al.

(10) Patent No.: US 6,344,718 B1
(45) Date of Patent: Feb. 5, 2002

(54) ELECTRIC ACTUATOR

(75) Inventors: Shigekazu Nagai, Tokyo; Akio Saitoh, Kawaguchi; Masaru Saitoh, Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,166

(22) Filed: Sep. 10, 1999

(30) Foreign Application Priority Data

Sep. 18, 1998 (JP) .......................................... 10-265257

(51) Int. Cl.[7] .................................................. H02K 7/06
(52) U.S. Cl. ............................ 318/14; 74/89.15; 310/80
(58) Field of Search ........................ 318/9–14; 74/89.14, 74/89.15; 310/80, 83, 20

(56) References Cited

U.S. PATENT DOCUMENTS

| | | | | |
|---|---|---|---|---|
| 5,099,707 A | * | 3/1992 | Tori et al. ................... | 74/89.15 |
| 5,689,994 A | * | 11/1997 | Nagai et al. ................ | 74/89.15 |
| 5,720,202 A | * | 2/1998 | Senjo et al. ................ | 74/89.15 |
| 5,796,187 A | * | 8/1998 | Nagai et al. ................... | 310/20 |
| 6,000,292 A | * | 12/1999 | Nagai et al. ................ | 74/89.15 |
| 6,084,326 A | * | 7/2000 | Nagai et al. ................... | 310/80 |

* cited by examiner

Primary Examiner—David S. Martin
(74) Attorney, Agent, or Firm—Oblon, Spivak, McClelland, Maier & Neustadt, P.C.

(57) ABSTRACT

Disclosed is an electric actuator comprising a feed nut member and a movable member for making displacement along a longitudinal direction of a frame by the aid of a rotary driving force transmitted by a ball screw shaft in accordance with a driving action of a rotary driving source, and guide blocks formed separately from the movable member and the feed nut member, for making displacement along the frame integrally with the movable member, wherein the movable member is detachably installed to the guide blocks.

10 Claims, 7 Drawing Sheets

ELECTRIC ACTUATOR

BACKGROUND OF THE INVENTION

1. Field of the Invention

The present invention relates to an electric actuator which makes it possible to transport, for example, a workpiece in accordance with a displacement action of a movable member.

2. Description of the Related Art

Figure 7:
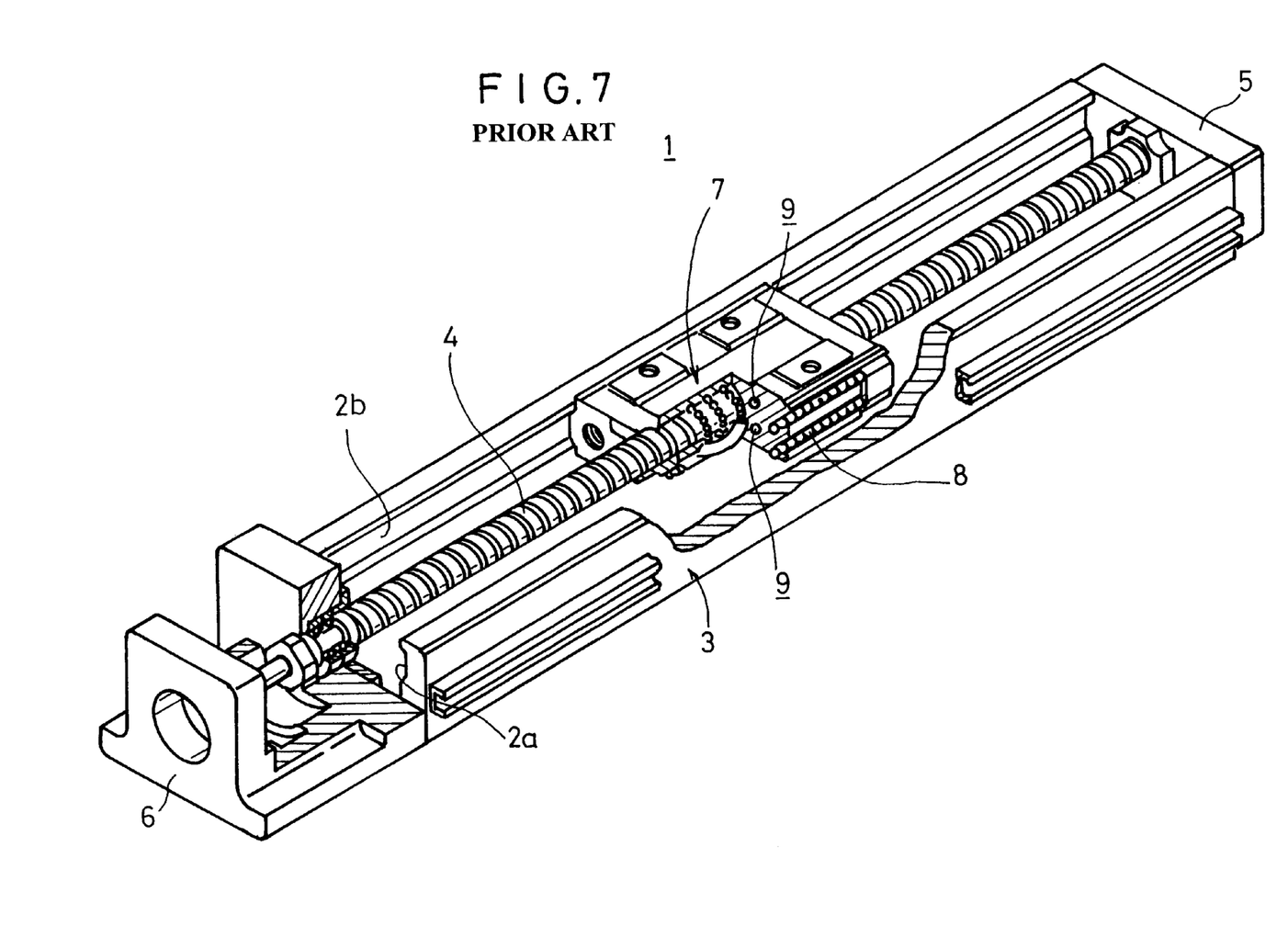
FIG. 7 shows a perspective view with partial cutout illustrating an electric actuator concerning the conventional technique.

The electric actuator has been hitherto used to transport, for example, a workpiece. Such an electric actuator concerning the conventional technique is shown in FIG. 7.

The electric actuator 1 comprises an opening extending in the longitudinal direction corresponding to its upper surface, and it further comprises lengthy outer rails 3 having a pair of mutually opposing rolling surfaces 2a, 2b formed on inner wall surfaces. A ball screw shaft 4 for transmitting the rotary driving force of an unillustrated motor is arranged in the opening formed by the outer rails 3. The ball screw shaft 4 is rotatably supported at its both ends by the aid of a support plate 5 and a motor bracket 6.

An inner block 7 for converting the rotary motion of the ball screw shaft 4 into the rectilinear motion in accordance with the engaging action of the ball screw shaft 4 is provided in the opening formed by the outer rails 3. The inner block 7 makes reciprocating movement along the longitudinal direction of the outer rails 3 in accordance with the rotary action of the ball screw shaft 4.

Circulating tracks 9 for circulating a plurality of balls 8 in accordance with the rolling action on the rolling surfaces 2a, 2b are formed on the inner block 7. In this case, the plurality of balls 8 function to smoothly guide the inner block 7 along the opening formed by the outer rails 3.

However, in the case of the electric actuator 1 concerning the conventional technique, the inner block 7 functions as a movable member to which an unillustrated slide table is installed for placing a workpiece thereon. Further, the inner block 7 also functions as a nut member to be fitted to the ball screw shaft 4. Furthermore, the inner block 7 also functions as a guide block through which the plurality of balls 8 roll and circulate therethrough. That is, the inner block 7 is formed by a block member which is formed in an integrated manner and which is provided with all of the foregoing functions.

Therefore, the electric actuator 1 concerning the conventional technique involves the following inconvenience. That is, for example, if the inner block 7 is damaged or worn, the entire inner block 7 including the plurality of balls 8 must be exchanged with a new inner block 7. Therefore, the maintenance cost is increased.

SUMMARY OF THE INVENTION

A general object of the present invention is to provide an electric actuator which makes it possible to reduce the maintenance cost by detachably providing a movable mechanism and a guide mechanism separately from each other.

A principal object of the present invention is to provide an electric actuator which is preferably usable in an environment such as a clean room in which cleanliness is required.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

In FIGS. 1 to 4, reference numeral 10 indicates an electric actuator according to a first embodiment of the present invention.

Figure 1:
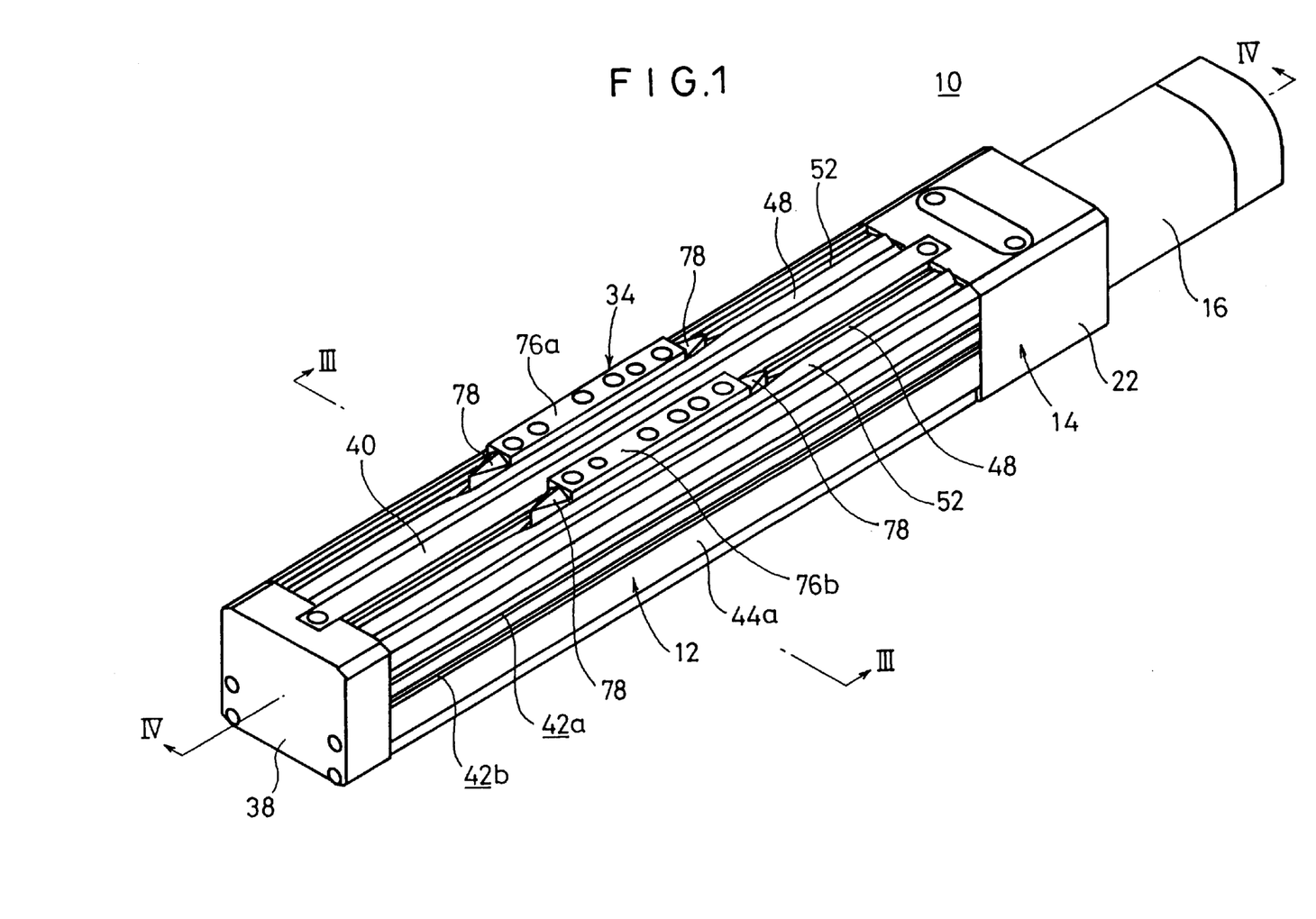
FIG. 1 shows a perspective view illustrating an electric actuator according to a first embodiment of the present invention.
Figure 2:
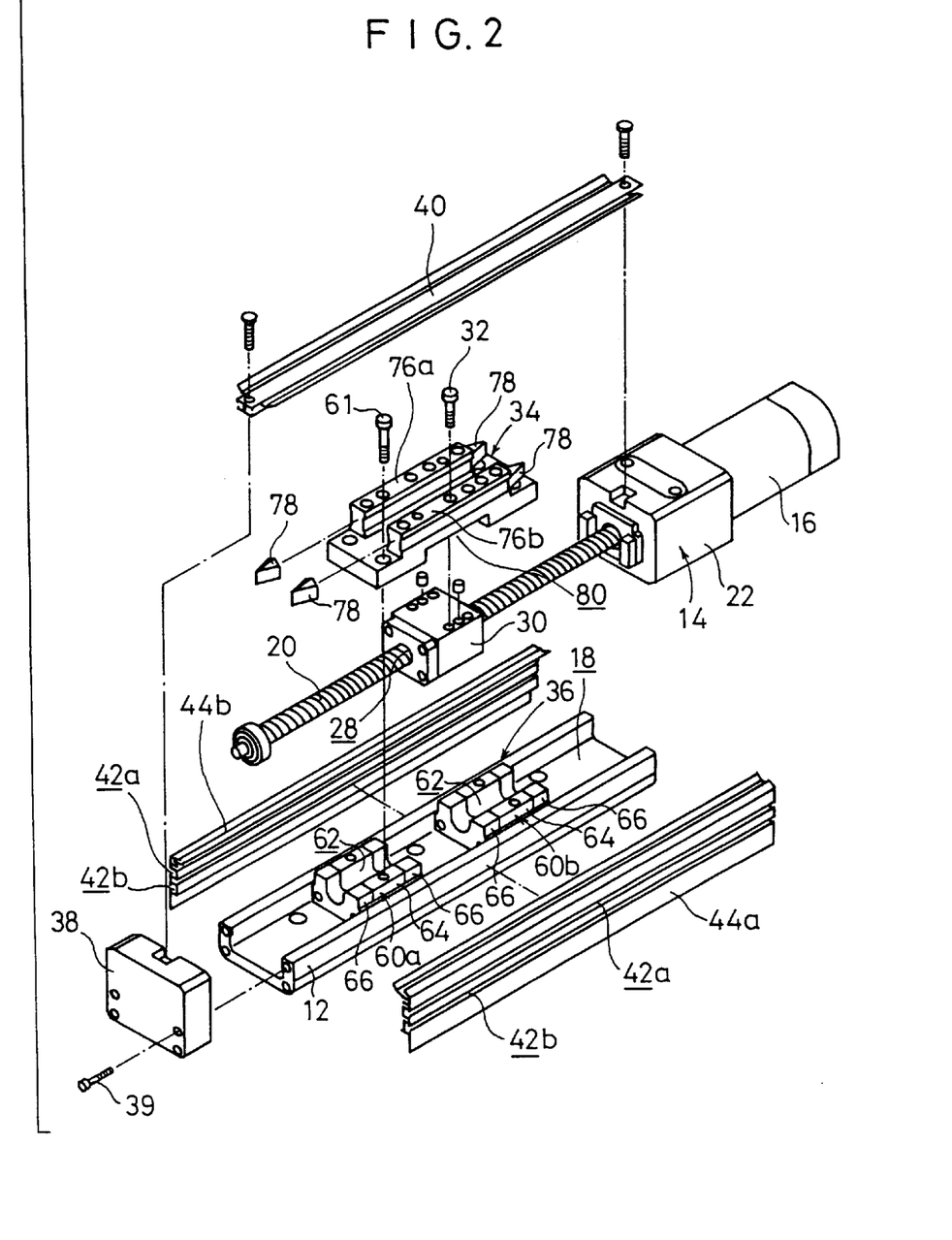
FIG. 2 shows an exploded perspective view illustrating the electric actuator shown in FIG. 1.

As shown in FIG. 2, the electric actuator 10 comprises a frame 12 which is formed to have a lengthy configuration, a rotary driving source 16 which is composed of, for example, a motor and which is connected via a connecting section 14 to the first end of the frame 12, and a ball screw shaft 20 which is arranged along the axial direction in a recess 18 of the frame 12 and which functions as a driving force-transmitting section for transmitting the rotary driving force of the rotary driving source 16.

Figure 4:
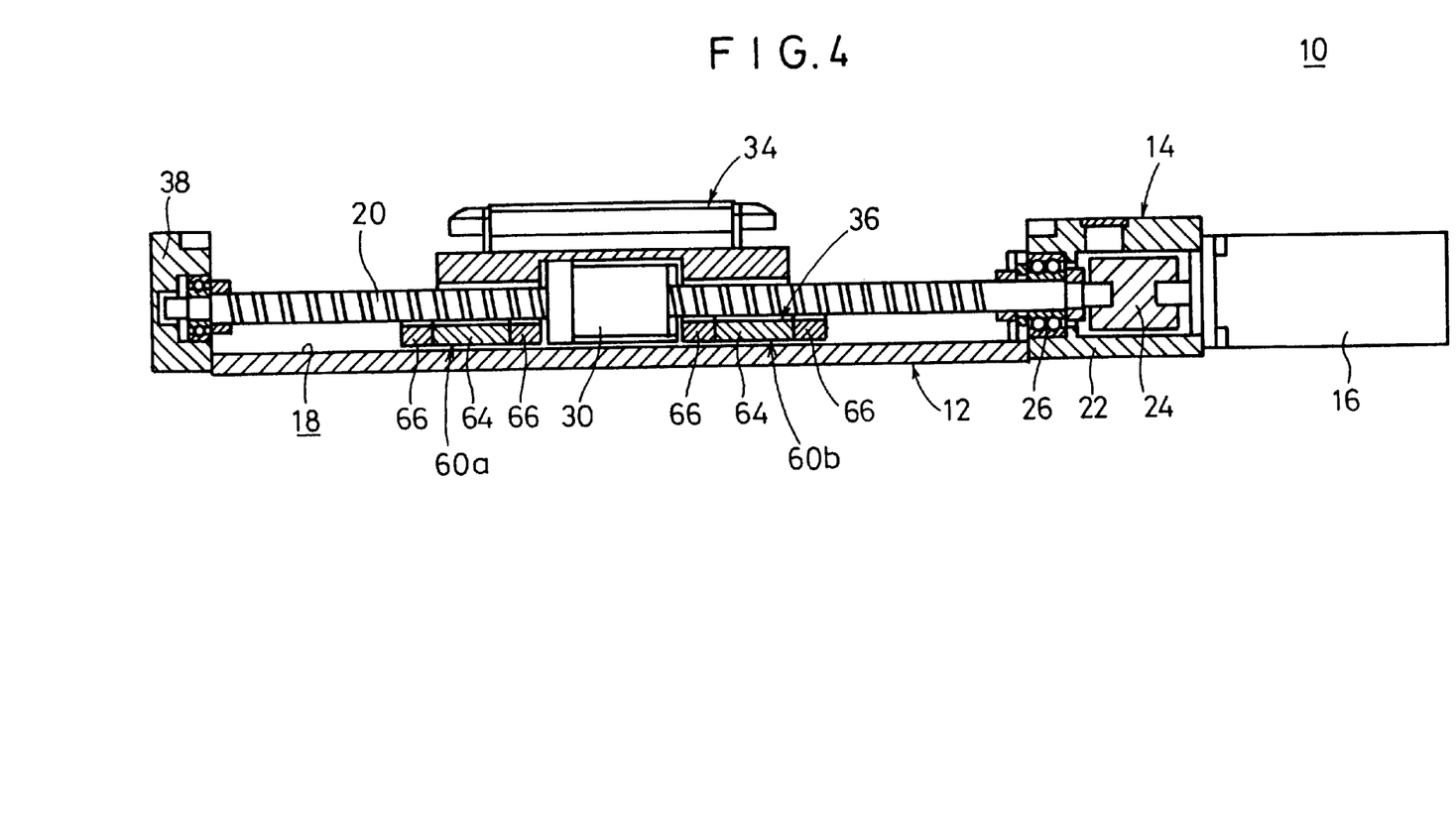
FIG. 4 shows a longitudinal sectional view taken along a line IV—IV shown in FIG. 1.

As shown in FIG. 4, the connecting section 14 comprises a block member 22 which is formed to have a hollow rectangular parallelepiped-shaped configuration, a coupling member 24 for coaxially coupling the ball screw shaft 20 and the driving shaft of the rotary driving source 16, and a bearing member 26 for rotatably supporting the first end of the ball screw shaft 20. An unillustrated electromagnetic brake mechanism may be provided at the end of the frame 12. The ball screw shaft 20 and the driving shaft of the rotary driving source 16 may be coaxially formed in an integrated manner without using the coupling member 24.

As shown in FIG. 2, the electric actuator 10 further comprises a feed nut member 30 having a rectangular parallelepiped-shaped configuration through which a screw hole 28 for making engagement with the ball screw shaft 20 is formed to penetrate and which is displaceable along the axial direction in accordance with the engaging action with the ball screw shaft 20, a movable member 34 which is connected to the feed nut member 30 by the aid of screw members 32 and which is displaceable along the longitudinal direction of the frame 12 integrally with the feed nut member 30 in accordance with the rotating action of the ball screw shaft 20, and a guide mechanism 36 for guiding the movable member 34 along the longitudinal direction of the frame 12. The frame 12 may be made of an aluminum material, and the hard alumite treatment may be applied to the surface of the frame 12.

An end block 38 for closing the opening and rotatably supporting the second end of the ball screw shaft 20 is installed by the aid of screw members 39 at the second end of the frame 12 along the longitudinal direction. A top cover 40 having a lengthy configuration, which is supported at its both ends by the end block 38 and the block member 22 respectively, is installed to the upper surface of the frame 12.

Side covers 44a, 44b, which are formed with a pair of long grooves 42a, 42b each having a substantially T-shaped cross section and extending substantially in parallel to one another in the longitudinal direction, are installed to mutually opposing outer wall surfaces of the frame 12 respectively. An unillustrated sensor for detecting, for example, the displacement amount of the movable member 34 is installed at a predetermined position of the long groove 42a, 42b.

Figure 3:
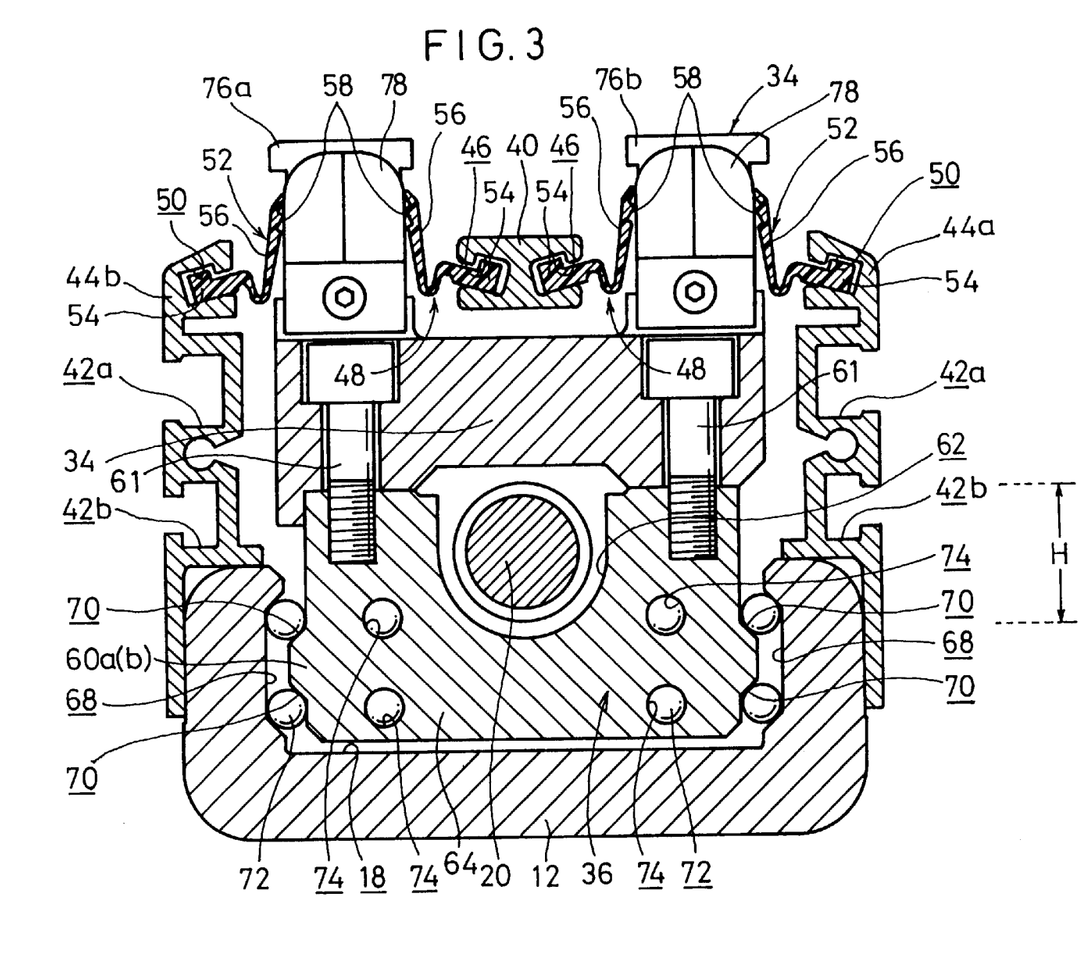
FIG. 3 shows a longitudinal sectional view taken along a line III—III shown in FIG. 1.

As shown in FIG. 3, long grooves 46 are formed along the longitudinal direction respectively on both narrow side surfaces of the top cover 40. First seal members 48 are installed along the long grooves 46. The first seal member 48 is formed of, for example, a resin material having flexibility. Long grooves 50 are also formed on the side covers 44a, 44b installed to the frame 12 in the same manner as described above. Second seal members 52, which are opposed to the first seal members 48 on the side of the top cover 40, are provided on the long grooves 50.

Each of the first and second seal members 48, 52 is constructed substantially in the same manner, and it comprises a holding section 54 which is held in the long groove 46, 50 and which has a shape corresponding to the cross-sectional shape of the long groove 46, 50, and a lip section 56 which is formed integrally with the holding section 54 and which has flexibility. An engaging section 58 having a step-shaped cross section is formed at the end of the lip section 56 for making mutual contact of the first seal member 48 and the second seal member 52 to close the recess 18 at the inside of the frame 12.

In this embodiment, the lip section 56 contacts with the wall surface of the movable member 34 to thereby close the gap between the side cover 44a, 44b and the movable member 34 and the gap between the top cover 40 and the movable member 34. Simultaneously, as for the portions except for the movable member 34, the mutually opposing lip sections 56 of the first and second seal members 48, 52 are superimposed with each other, and they make contact with engaging sections 58 to close the recess 18 at the inside of the frame 12. Thus, the dust or the like, which is produced in the frame 12, is successfully prevented from outflow to the outside of the frame 12. Therefore, the electric actuator 10 according to the embodiment of the present invention can be preferably used in an environment such as a clean room in which cleanliness is required.

The forward end of the lip section 56 may be formed and branched into two. One of branched lip sections (not shown) may be flexibly bent upwardly, and the other lip section (not shown) may be flexibly bent downwardly.

As shown in FIG. 2, the guide mechanism 36 is constructed separately from the feed nut member 30. The guide mechanism 36 includes a pair of guide blocks 60a, 60b which are arranged and separated from each other by a predetermined spacing distance in the recess 18 of the frame 12. The pair of guide blocks 60a, 60b are fixed to end sides of the movable member 34 by the aid of screw members 61 respectively, and they are displaceable along the longitudinal direction of the frame 12 integrally with the movable member 34.

As shown in FIG. 2, each of the guide blocks 60a (60b) comprises a main guide block body 64 and a pair of return blocks 66 which are integrally connected to the both ends of the main guide block body 64 interposed therebetween. A groove 62 having a substantially U-shaped cross section, which extends in the longitudinal direction, is formed through substantially central portions of the main guide block body 64 and the pair of return blocks 66 (see FIG. 3).

As shown in FIG. 3, circulating tracks, along which a plurality of balls 72 roll, are formed by rolling grooves 68 which are formed on each of the inner wall surfaces of the frame 12 and which is substantially composed of a recess and a pair of rolling grooves 70 each of which has a circular arc-shaped cross section and which are formed on the outer wall surface of each of the guide blocks 60a, 60b. Each of the circulating tracks is formed to communicate with a circulating hole 74 of each of the guide blocks 60a, 60b via an unillustrated return passage formed through the return block 66.

In this embodiment, as shown in FIG. 3, the plurality of balls 72 are arranged in two arrays in the vertical direction so that they roll and circulate along the upper rolling groove 68 and the upper circulating hole 74 of the guide block 60a, 60b and they roll and circulate along the lower rolling groove 68 and the lower circulating hole 74 of the guide block 60a, 60b.

As shown in FIG. 2, a pair of projecting strips 76a, 76b, which are separated from each other by a predetermined spacing distance and which extend substantially in parallel to one another in the longitudinal direction, are formed on the upper surface of the movable member 34. A sliding member 78, which is formed to be tapered-off like a shape of ship's bow and which functions to mitigate the sliding resistance with respect to the first and second seal members 48, 52, is installed to each of the both ends of the pair of projecting strips 76a, 76b (see FIGS. 1 and 2). As shown in FIG. 2, a recess 80 for positioning and fixing the feed nut member 30 to be engaged with the ball screw shaft 20 is formed on the bottom surface of the movable member 34.

The electric actuator 10 according to the first embodiment of the present invention is basically constructed as described above. Next, its operation, function, and effect will be explained.

When the rotary driving source 16, which is connected to an unillustrated power source, is energized, the rotary driving force of the rotary driving source 16 is transmitted via the coupling member 24 to the ball screw shaft 20. Thus, the ball screw shaft 20 is rotated in the predetermined distance. The rotary driving force is transmitted to the movable member 34 via the feed nut member 30 which is engaged with the ball screw shaft 20. Accordingly, the movable member 34 is displaced along the longitudinal direction of the frame 12.

In this embodiment, the plurality of balls 72, which are provided for the guide blocks 60a, 60b, roll along the circulating holes 74 and the circulating tracks formed by the rolling grooves 68 of the frame 12 and the rolling grooves 70 of the guide blocks 60a, 60b. Accordingly, the movable member 34 can be smoothly displaced.

In the embodiment of the present invention, for example, when the ball screw shaft 20 is replaced with a new ball screw shaft 20 because the screw thread of the ball screw shaft 20 is worn and the linear accuracy of the movable member 34 is deteriorated, when the ball screw shaft 20 is replaced with another ball screw shaft having a different diameter (not shown), or when the feed nut member 30 with deterioration of durability due to the secular change is replaced with a new feed nut member 30, the ball screw shaft 20 and the feed nut member 30 can be conveniently exchanged by removing the top cover 40 from the upper surface of the frame 12, and then removing the screw members 32 of the movable member 34 screw-fastened to the feed nut member 30 and the pair of guide blocks 60a, 60b respectively.

During this procedure, in the embodiment of the present invention, the pair of guide blocks 60a, 60b are constructed separately from the feed nut member 30 and the movable member 34, and they are provided detachably by the aid of the screw members 61. Accordingly, the ball screw shaft 20 and the feed nut member 30 can be exchanged while maintaining the state in which the pair of guide blocks 60a, 60b are installed in the recess 18 of the frame 12. Therefore, in the embodiment of the present invention, the maintenance cost can be reduced, because it is unnecessary to exchange the guide blocks 60a, 60b, as compared with the conventional technique in which it is necessary to exchange all of the ball screw shaft 4 and the inner block 7 including the guide block.

In the embodiment of the present invention, even when the guide blocks 60a, 60b and the feed nut member 30 are constructed separately from each other, then the groove 62 having the substantially U-shaped cross section is formed through the central portion of the guide block 60a (60b), and thus the ball screw shaft 20 can be designed to be disposed at the low position along with the groove 62. Therefore, the embodiment of the present invention is advantageous in that the size in the height direction of the entire apparatus can be suppressed in an amount corresponding to the depth H of the groove 62 (see FIG. 3). As a result, the size in the height direction is suppressed, and the entire apparatus is made flat. Thus, it is possible to miniaturize the entire apparatus.

The rolling grooves 68, 70 for constructing the guide mechanism 36 may be subjected to the hardening respectively, followed by the grinding. Further, the extra-precision finishing treatment such as the shot peening may be performed to harden the rolling surfaces of the rolling grooves 68, 70. Thus, it is possible to avoid wearing. The lubrication performance of the ball 72 can be improved by providing an unillustrated oil reservoir hole communicating with the rolling surfaces of the rolling grooves 68, 70. Further, for example, the surface of the frame 12 formed by extrusion or by pultrusion may be appropriately subjected to the raydent treatment, the chromium plating, and the kanigen plating (registered trademark).

In this case, the ball 72 may be made of a material such as aluminum, polyimide resin, and ultrahigh molecular weight polyethylene, while the frame may be made of an aluminum material. Further, the rolling grooves 68, 78 may be subjected to the surface treatment based on the kanigen plating (registered trademark). It is more preferable that a nonwoven fabric for adsorbing the dust contained in the lubricating oil is provided in the unillustrated oil reservoir hole.

As a result, the electric actuator 10 can be preferably used in the environment such as the clean room in which the cleanliness is required.

Figure 5:
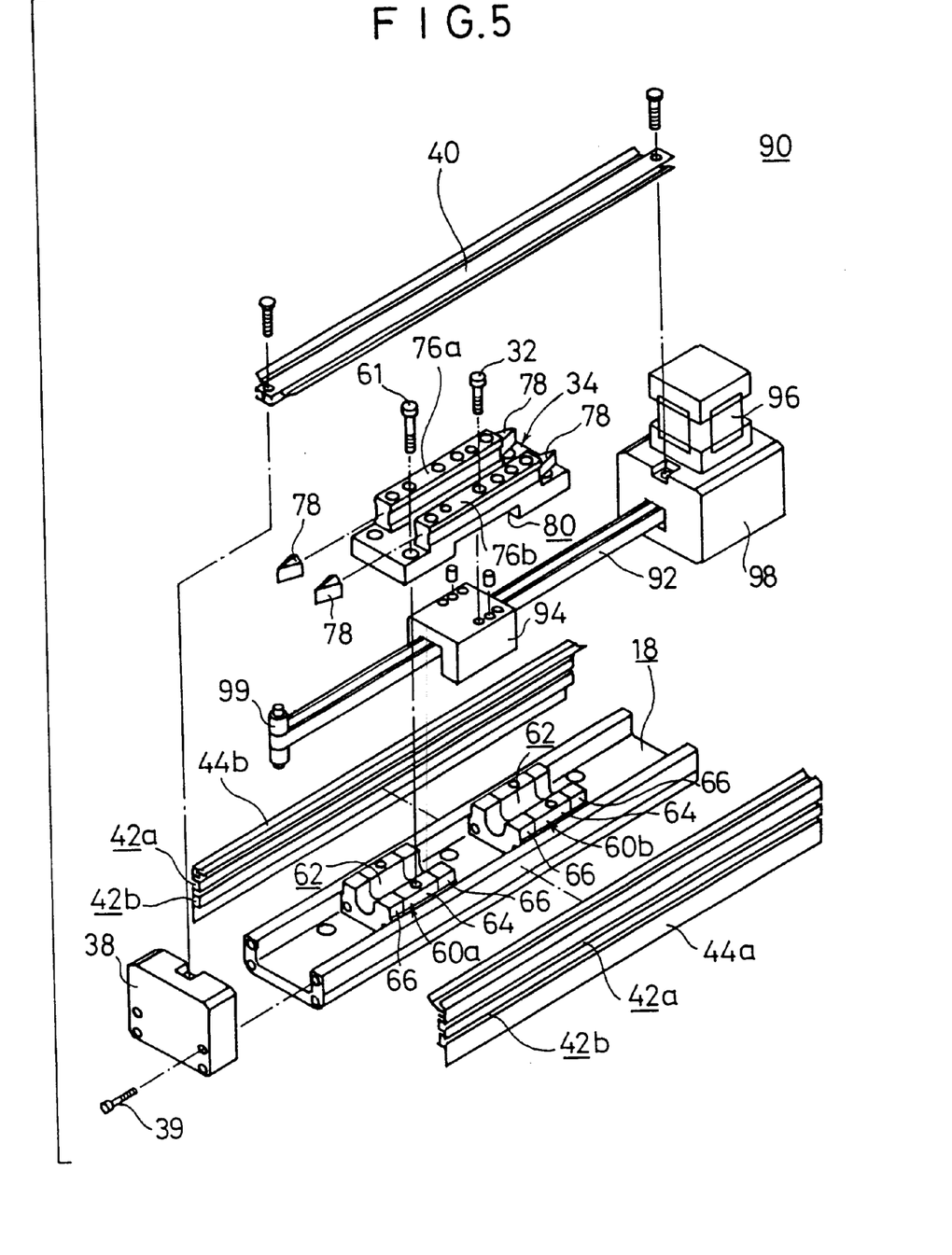
FIG. 5 shows an exploded perspective view illustrating an electric actuator according to a second embodiment of the present invention.

Next, an electric actuator 90 according to a second embodiment of the present invention is shown in FIG. 5. In the embodiments described below, the same constitutive components as those of the electric actuator 10 shown in FIG. 2 are designated by the same reference numerals, detailed explanation of which will be omitted.

The electric actuator 90 according to the second embodiment differs in that a timing belt 92 is used in place of the ball screw shaft 20 which functions as the driving force-transmitting section. The timing belt 92 is interposed by a fastening plate (not shown) connected to a movable block 94. Thus, the timing belt 92 and the movable block 94 are arranged so that they are displaceable in an integrated manner.

Reference numeral 96 indicates a rotary driving source such as a motor. Reference numeral 98 indicates a block member in which an unillustrated pulley connected to a rotary driving shaft of the rotary driving source 96 is arranged. Reference numeral 99 indicates a pulley over which the timing belt 92 is allowed to run and which is rotatably supported by the end block 38.

The second embodiment is advantageous in that the electric actuator 10 installed with the ball screw shaft can be conveniently changed into the electric actuator 90 installed with the timing belt, while using many common parts.

Figure 6:
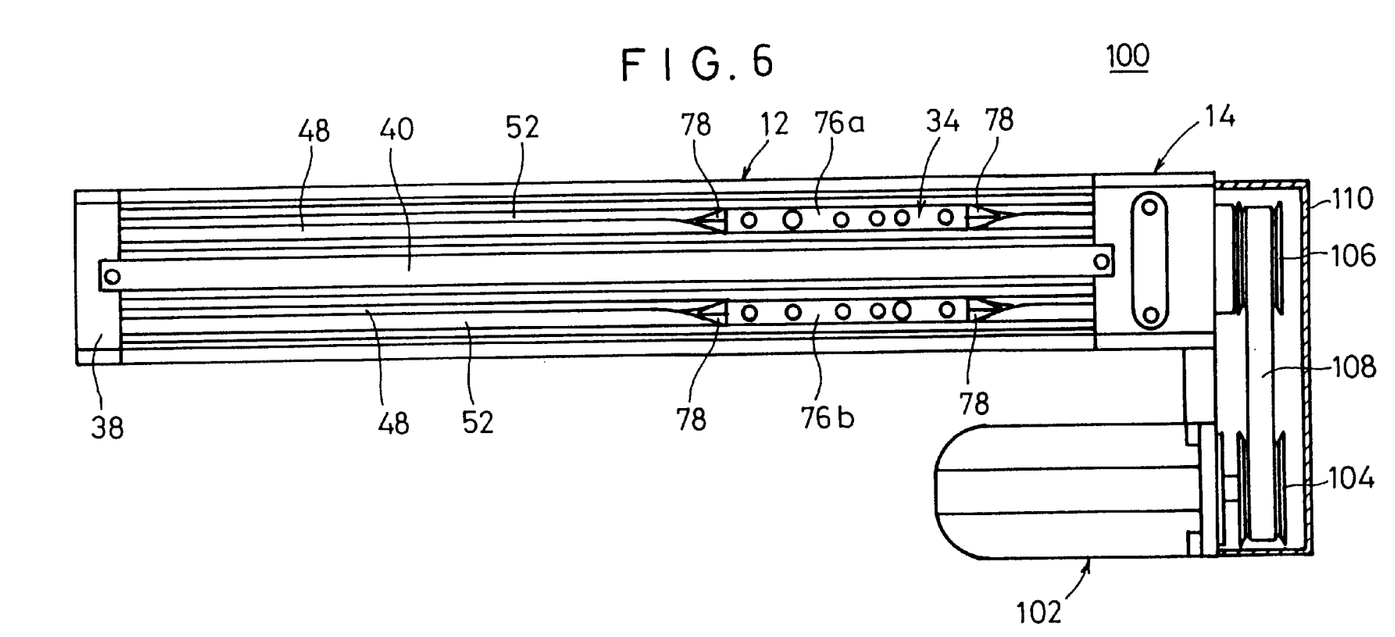
FIG. 6 shows a plan view with partial cross section illustrating an electric actuator according to a third embodiment of the present invention.

Next, an electric actuator 100 according to a third embodiment of the present invention is shown in FIG. 6.

In the electric actuator 100 according to the third embodiment, a rotary driving source 102 is arranged substantially in parallel to the axis of the frame 12. The rotary driving force is transmitted by the aid of a belt 108 which is allowed to run over a first pulley 104 connected to the driving shaft of the rotary driving source 102 and a second pulley 106 connected to the ball screw shaft 20. Reference numeral 110 indicates a cover member.

In the electric actuator 100, the frame 12 is not coaxially connected to the rotary driving source 102. The frame 12 is connected to the rotary driving source 102 substantially in parallel to one another by using the belt 108. Thus, the electric actuator 100 is advantageous in that the size in the longitudinal direction of the entire apparatus can be suppressed.

What is claimed is:

1. An electric actuator comprising:
   a frame for forming an outer frame;
   a driving section attached to said frame;
   a driving force-transmitting section for transmitting driving force of said driving section;
   a movable mechanism disposed on one side of said driving force-transmitting section for making displacement along a longitudinal direction of said frame by the aid of said driving force transmitted by said driving force-transmitting section in accordance with a driving action of said driving section; and
   a displaceable guide mechanism disposed on another side of said driving force-transmitting section opposite from said movable mechanism and formed separately from said movable mechanism, for making displacement along said frame integrally with said movable mechanism,
   wherein said movable mechanism is installed detachably with respect to said guide mechanism.

2. The electric actuator according to claim 1, wherein said driving force-transmitting section includes at least a ball screw shaft or a timing belt, and said ball screw shaft and said timing belt are provided exchangeably.

3. The electric actuator according to claim 2, wherein a rotary driving source is provided substantially in parallel to said ball screw shaft, and rotary driving force of said rotary driving source is transmitted via a belt which is allowed to run over pulleys.

4. The electric actuator according to claim 1, wherein said movable mechanism includes a feed nut member for making engagement with a ball screw shaft, and a movable member screw-fastened to said feed nut member.

5. The electric actuator according to claim 1, wherein said frame is formed with a recess, and said recess is closed by first seal members supported by a top cover and second seal members supported by side covers.

6. The electric actuator according to claim 5, wherein said first seal member and said second seal member are formed to have an identical configuration with a flexible material, each of which has a holding section to be held by a long groove of said top cover or said side cover, and a lip section formed integrally with said holding section.

7. The electric actuator according to claim 5, further comprising sliding members connected to both ends in an axial direction of a movable member, for separating said first seal member from said second seal member by making engagement with said first seal member and said second seal member which are superimposed with each other, wherein each of said sliding members is formed to have a ship's bow-shaped configuration.

8. An electric actuator comprising:
   a frame for forming an outer frame;
   a driving section attached to said frame;
   a driving force-transmitting section for transmitting driving force of said driving section;
   a movable mechanism for making displacement along a longitudinal direction of said frame by the aid of said driving force transmitted by said driving force-transmitting section in accordance with a driving action of said driving section; and
   a guide mechanism formed separately from said movable mechanism, for making displacement along said frame integrally with said movable mechanism,
   wherein said movable mechanism is installed detachably with respect to said guide mechanism, and
   wherein said guide mechanism includes a pair of guide blocks, and said pair of guide blocks are fixed to a movable member for constructing said movable mechanism by the aid of screw members.

9. The electric actuator according to claim 8, wherein a groove having a substantially U-shaped cross section is formed along said longitudinal direction through said pair of guide blocks.

10. The electric actuator according to claim 8, wherein said guide block comprises a main guide block body, and a pair of return blocks integrally connected to both ends of said main guide block body interposed therebetween.

* * * * *